Patented Feb. 28, 1928.

1,660,851

UNITED STATES PATENT OFFICE.

JOHANN TENGLER, OF TAGERWILEN, CANTON THURGAU, SWITZERLAND.

PROCESS FOR PRODUCING A BINDING MEDIUM FOR COLORS, VARNISHES, AND CEMENTS.

No Drawing. Application filed May 14, 1927, Serial No. 191,538, and in Switzerland May 11, 1926.

In my improved process I utilize old rubber, such for instance as rubber tires, tubes, boots, or the like, and by means of my improved process I produce a binding material which is not brittle after drying, adheres to the surface to which it is applied, is not detrimentally affected by temperature variations, and is an efficient carrier for colors.

As the important feature of my invention I treat the old rubber with a hydrogenated hydrocarbon, that is, a hydrocarbon in which there is an excess of hydrogen which in the process chemically unites with the sulphur of the old rubber to form hydrogen sulphide, and thereby devulcanize the rubber. After the devulcanization and thorough disolving of the old rubber, it is again vulcanized uniformly and to the desired extent, by the addition of fresh sulphur. Thus a uniform and homogeneous product is obtained from a worthless raw material varying greatly as to degree of vulcanization and other characteristics.

In carrying out the process the old rubber is pulverized and placed in an autoclave with the devulcanizing liquid. This is preferably hydronaphthalene. The mixture is subjected to pressure and heat, whereby the hydrogen of the hydronaphthalene combines with the sulphur in the vulcanized rubber and separates out as hydrogen sulphide. Thereafter, a suitable solvent, such for instance as benzene, benzol, or the like, is added, and the necessary pressure and heat are applied to effect the complete solution of the whole mass. The solution is then freed from the napthalene which has been produced from the hydronaphthalene. This naphthalene may be removed in any suitable manner, but preferably by cooling the solution to a low temperature at which the naphthalene will separate out.

The liquid is then vulcanized by the addition of sulphur or suitable sulphur preparation. This revulcanization is effected by the application of heat and pressure, and is carried on to the desired extent by the control of the amount of sulphur added. A uniformity of product is thus secured, irrespective of wide variations in the character of the raw material, namely old rubber, and without the necessity for analyzing or testing the various lots of old rubber which are used. When the product is applied to an object the solvent rapidly evaporates, leaving the vulcanized rubber coating either to carry a color or to act as a varnish or cement.

Having thus described my invention, what I claim as new and desire to secure by Letters Patent is:

The process for producing a binding for colors, varnishes and cements, which consists in pulverizing old rubber, treating it with hydronaphthalene under heat and pressure to effect the formation of hydrogen sulphide and naphthalene, dissolving the resultant rubber in a solvent of lower boiling point than naphthalene, removing the naphthalene, and revulcanizing the rubber in the presence of the solvent.

JOHANN TENGLER.